Dec. 18, 1956 W. T. ROSSELL 2,774,312
PEDESTAL GUIDE ASSEMBLY
Filed July 29, 1952
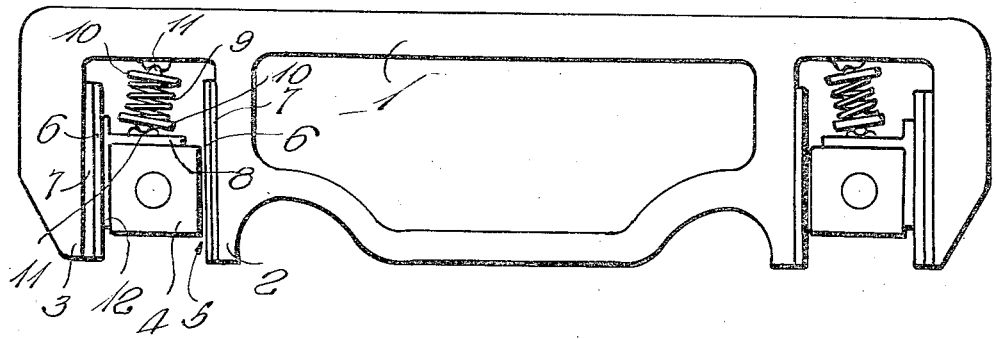
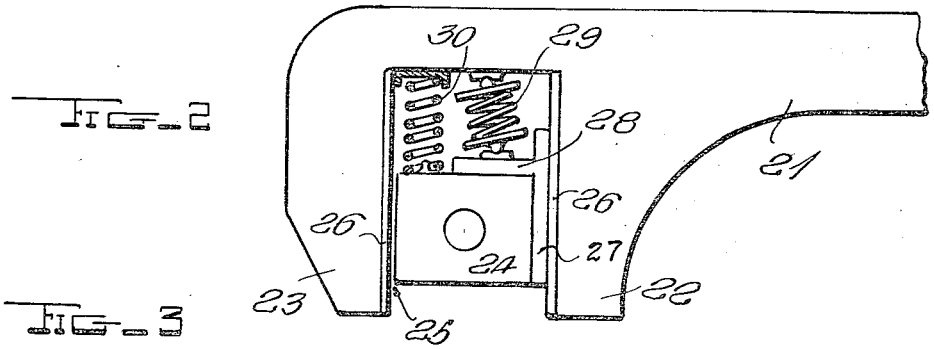
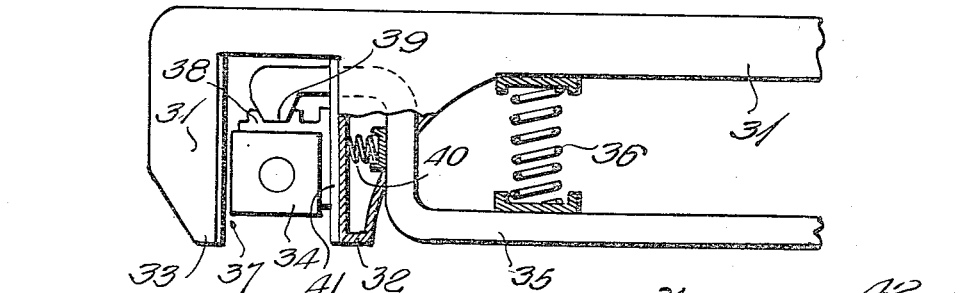
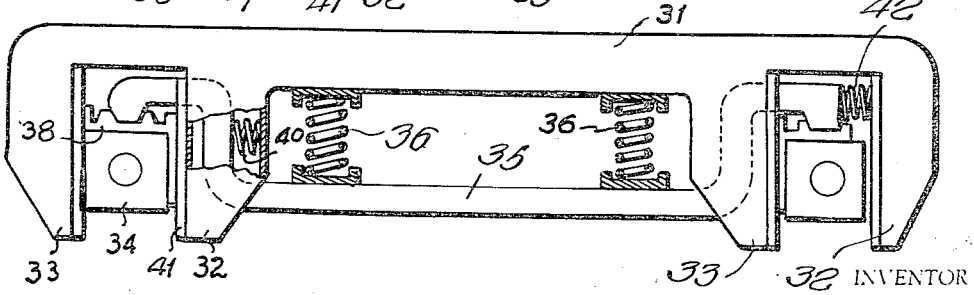
INVENTOR
WILLIAM T. ROSSELL
BY
ATTORNEY United States Patent Office 2,774,312
Patented Dec. 18, 1956

2,774,312

PEDESTAL GUIDE ASSEMBLY

William T. Rossell, New York, N. Y., assignor to Transit Research Corporation, New York, N. Y., a corporation of New York Application July 29, 1952, Serial No. 301,570

5 Claims. (Cl. 105—224)

This invention relates to rail trucks and has for its object to provide an improved axle journal bearing assembly thereby to provide improved action of the axles during operation.

The action of the axes of the axles of a rail truck determine the extent of the horizontal weaving motion known as hunting. When hunting approaches the violent stage it becomes a speed limiting factor and whether violent or not it seriously affects the riding comfort of the truck. When hunting is eliminated the functions which the truck springs are called upon to perform are greatly simplified. Now, it is realized that hunting may be eliminated by rigidifying the positions of the axle bearings so that the axles must always remain exactly parallel but in that case the truck frame will be subjected to such undue strains that it may be expected to fracture, and, in addition, wheel flange wear will be excessive on some of the wheels of the truck. For these reasons it is common practice to provide pedestal guides which permit an amount of free movement of the journal boxes with respect to the truck frame, but these relative motions permit the axles to assume out-of-parallel relations which change constantly because of the lack of restraint, thus engendering hunting.

As a further aid to understanding hunting movement it is to be realized that such motions are harmonics, usually in the form of sine waves, so that it has been found that the axes of the axles may be permitted a fair amount of relative movement without causing hunting if the relative movement does not induce or encourage harmonic movements.

It is therefore the principal object of this invention to provide an improved journal bearing assembly which will employ the conventional journal box and pedestal guide construction but which will eliminate free movement of the journal bearings or boxes with respect to the pedestal guides regardless of the amount of wear therebetween.

More particularly, it is the specific object to permit relative movements of the axle bearings with respect to the pedestal guides but to provide rather heavy frictional means to oppose such movements, thereby preventing harmonic movements which induce hunting, the friction opposing not only initial displacement of the axles with respect to the pedestals but also any tendency of the axles to return to their initial position. In this way, if the normal positions which the axles seek are slightly out of parallel or slightly laterally displaced by reason of variations in the sizes of the wheels, the axles may retain such positions and are frictionally restrained but not prohibited from assuming a new position with respect to the pedestal guides. The restraint is sufficient to prevent or to break up a harmonic weaving motion of the truck.

Other objects of the invention are to teach the application of the principles involved to different types of trucks including those with and without equalizer bars and to teach the applications of the principles to existing designs with little or no changes in present basic construction.

Other objects and advantages will become hereinafter more fully apparent as reference is had to the accompanying drawings wherein my invention is illustrated and in which—

Figure 1 is a side elevation of a pedestal truck frame having journal bearing assemblies constructed in accordance with my invention, Figure 2 is a side elevation of a pedestal assembly showing a modified form of my invention, Figure 3 is a side elevation of one end of a truck equipped with an equalizer bar showing my invention applied thereto, and Figure 4 is a side elevation of an equalized truck showing the construction of Figure 3 with an additional or alternative control means added thereto.

More particularly, the numeral 1 refers to a truck side frame having the conventional pedestal guides 2 and 3 by which the journal bearing or journal box 4 is guided. Also, according to conventional practice, I illustrate the usual clearance between the journal box and a pedestal guide 3 by the reference character 5. Wear plates 6 between the pedestal guides and the journal box are sometimes backed by rubber 7 and when the trucks are new the clearance 5 is often very small. However, the clearance increases with wear and soon becomes sufficiently large to permit or induce hunting movements by the truck. Since hunting is a harmonic motion, I herewith propose to oppose free movements of the journal boxes with respect to the pedestal guides by interposing a friction plate 8 between the top of the journal box 4 and the spring 9, which supports the frame 1 from the journal box. The plate 8 should have a fixed position longitudinally of the truck but should be able to move vertically with the journal box and in order to meet those requirements I incline the springs 9 in a direction longitudinally of the frame 1. While, perhaps, not essential, in the interests of long life of the springs 9, I provide them with spring caps 10 at each end, each cap having a rocker 11 outwardly thereof for contact with the frame and journal box, respectively.

In operation, the springs 9 impart to the friction plates 8 a force component which urges the vertical portions 12 of these plates into constant contact with a guide wear plate 6 but permits vertical movement of the plate 8 with the journal box. The journal box may change its position with respect to the pedestals 2 and 3, as permitted by the clearance 5, when a force is built up which exceeds the frictional resistance between the plate 8 and the journal box, but the movement will be resisted by that frictional resistance and there will be no consequent restoring force which might induce harmonic motions. The axles are thereby allowed to correct their relative positions due to slight misalignment of the pedestal guides and to correct for slight variations in wheel sizes.

In Figure 2 the same type of frame and pedestals appears as is illustrated in Figure 1. The frame 21 has pedestal guides 22 and 23 for positioning the journal box 24 and two coil springs 29 and 30 support the frame 21 from each journal box. Between the journal box and the spring 29, I interpose a friction plate 28 which spans a portion of the distance between the pedestal guides 22 and 23. This plate 28 has vertical walls 27 for frictional engagement with a pedestal wear plate 26. The spring 30 rests directly on the journal box 24 so that only a portion of the weight of the frame 21 and the body supported thereby is supported by the friction plate 28.

In operation, the action is the same as described in connection with Figure 1 except that the friction between the plate 28 and the top of the journal box 24 is reduced by an amount dependent upon the proportion of the weight carried by the spring 30. The distribution of the weight as between the springs 29 and 30 may be proportioned in any desired manner and hence the friction between the plate 28 and the journal box 24 may be selected at any desired figure. The clearance 25 permits the journal box to move with respect to the plate 28 but there is no restoring force to return the plate 28 and the journal box to their initial position.

The construction illustrated in Figures 3 and 4 show the invention as applied to an equalized truck. The frame 31 is equipped with pedestal guides 32 and 33 to guide the journal boxes 34. An equalizer bar 35 at each side of the truck has two ends, each of which rests on top of a journal box. Main springs 36 support the frame 31 from the equalizer bars. The journal boxes have a slight clearance 37 with respect to the pedestal guides. Between the equalizer bars and the top of each journal box I interpose a friction plate 38 each of which has a depression 39 to receive the end of the equalizer bar and to prevent relative movements therebetween. Between the frame 31 and each equalizer bar, at any suitable location, I provide a spring 40 which exerts great force longitudinally in order to jam one end of the friction plate 38 against a pedestal wear plate 41, the force exerted being great enough so that relative frictional movement of the journal boxes 34 with respect to the plate 38 will not cause longitudinal movement of the plate 38 with respect to the pedestal guides 32 and 33. The plate 38 can move vertically in the pedestal guides. The journal boxes 34 and the friction plates 38, can move vertically together, and the journal boxes can move longitudinally of the frame by a total distance equal to the clearance 37, against the frictional resistance of the plate 38.

In Figure 3 only one spring 40 per equalizer bar is provided to establish and to maintain the longitudinal force which holds the ends of the friction plates 38 against relative longitudinal movement with respect to the pedestal guides. Additional springs 42 may be provided or the springs 40 may be replaced by the spring 42 (Figure 4) between one end of each equalizer bar and a pedestal 32, or, if preferred, both springs may be used as illustrated in Figure 4. In fact a selection of the exact location of the springs 40 and 42 should be left to the designer of any particular truck to which this invention is applied and the locations herein illustrated are intended as suggestions only.

Figure 4 represents the same truck as Figure 3 with the spring 42 added, hence the reference characters are otherwise the same. The spring 42, being placed between the end of the equalizer bar and a pedestal guide 32 urges the equalizer bar in the same direction as does the spring 40. The action is exactly the same as has been heretofore described.

It is to be noted that in both trucks provision is made for preventing any longitudinal movements of the friction plates with respect to the pedestal guides. It would not be fatal to the invention if such movement should occur or even if such a movement should be provided so long as there is sufficient resistance to movement of the journal boxes with respect to the pedestal guides to obviate or to break up the harmonic hunting motions. An occasional breaking away of the friction guides from their assigned positions can be made to occur simply by weakening the springs which cause the longitudinal forces acting upon them. However, it is preferred that the friction plates never leave their assigned longitudinal positions.

Various changes may be made without departing from the spirit of my invention and I therefore desire to be extended protection as defined by the scope of the appended claims.

What I claim is:
1. In a rail truck, a truck frame having pairs of pedestal guides, a journal bearing positioned between the members of each pair of said guides, spring means supporting said frame from said bearings and providing for relative vertical movements therebetween, a friction plate interposed between said spring means and each of said journal bearings, said pedestal guides limiting the movements of said journal bearings and said plates longitudinally of said frame, said spring means urging said plate constantly against one of its guides, said bearing being movable longitudinally of said frame against the friction of said plate as permitted by the spacing of the members constituting said guides.

2. In a rail truck, a truck frame having pedestal guides, a journal bearing positioned between said guides, spring means supporting said frame from said bearing and providing for relative vertical movements therebetween, a friction plate interposed between said spring means and said journal bearing, said spring means urging said friction plate into constant pressure engagement with one of said guides, said spring means urging said friction plate against one of said guides with a force in a longitudinal direction greater than the longitudinal force necessary to overcome the friction between said journal bearing and said plate.

3. In a rail truck, a truck frame having pedestal guides, a journal bearing positioned between said guides, spring means supporting said frame from said bearing, and a friction plate interposed between said spring means and said bearing, said spring means including a spring having its axis inclined to the vertical in a direction fore and aft of the truck whereby the force resulting from the weight imposed on said spring has one vertical component and a component in a fore and aft direction said friction plate being urged against one of said pedestal guides by said lateral component, said bearing being movable longitudinally of said frame in said pedestal guides against the friction between said bearing and said friction plate.

4. In a rail truck, a truck frame having pedestal guides, a journal box positioned between said guides, spring means supporting said frame from said journal box, said spring means including one spring having spring caps top and bottom thereof, each of said caps having a rocker outwardly thereof, a friction plate interposed between the lower one of said spring caps and said journal box, said spring being inclined to the vertical whereby said friction plate is urged against one of said pedestal guides by a component of the vertical force imposed on said spring, said journal box being movable longitudinally of said frame against the friction between said plate and said journal box.

5. In a rail truck, a truck frame having pairs of pedestal guides at each corner thereof, journal bearings positioned between the members of each of said pairs of guides, springs supporting said frame from said journal bearings and providing relative vertical movements therebetween, friction plates supporting said springs on said bearings, each of said friction plates being movable vertically with its journal bearing, said springs continuously urging each of said friction plates against one of the pedestal guides of its journal bearing, said friction plates frictionally resisting all longitudinal movements of said journal bearings relative to their respective pedestal guides.

References Cited in the file of this patent
UNITED STATES PATENTS

| | | |
|---|---|---|
| 775,271 | Graham | Nov. 15, 1909 |
| 2,297,863 | Barrows et al. | Oct. 6, 1942 |
| 2,308,750 | Graham | Jan. 19, 1943 |
| 2,474,008 | Meyer | June 21, 1949 |